United States Patent [19]

Matsui et al.

[11] Patent Number: 4,683,562
[45] Date of Patent: Jul. 28, 1987

[54] OPTICAL INFORMATION RECORDING DISK

[75] Inventors: Fumio Matsui; Yasushi Murata, both of Tokorozawa, Japan

[73] Assignee: Pioneer Electronic Corporation, Tokyo, Japan

[21] Appl. No.: 767,021

[22] Filed: Aug. 19, 1985

[30] Foreign Application Priority Data

Aug. 23, 1984 [JP] Japan .............................. 59-127779[U]

[51] Int. Cl.⁴ ................................................ G11B 7/24
[52] U.S. Cl. ...................................... 369/284; 369/286
[58] Field of Search ................. 369/283, 284, 285, 286

[56] References Cited

U.S. PATENT DOCUMENTS 4,564,850  1/1986  Kazuharu ............................ 369/284

FOREIGN PATENT DOCUMENTS 0109245  5/1984  European Pat. Off. ............ 369/284
0066548  4/1982  Japan .................................. 369/284

Primary Examiner—Steven L. Stephan
Attorney, Agent, or Firm—Fleit, Jacobson, Cohn & Price

[57] ABSTRACT

An optical information recording disk comprising a reinforcement disk provided with circumferential banks of spacers and a pair of substrates sandwiching the disk to cover an information bearing layer and spaces therebetween which is of sufficient strength to support itself against deflection when loaded for playing in the player.

1 Claim, 11 Drawing Figures

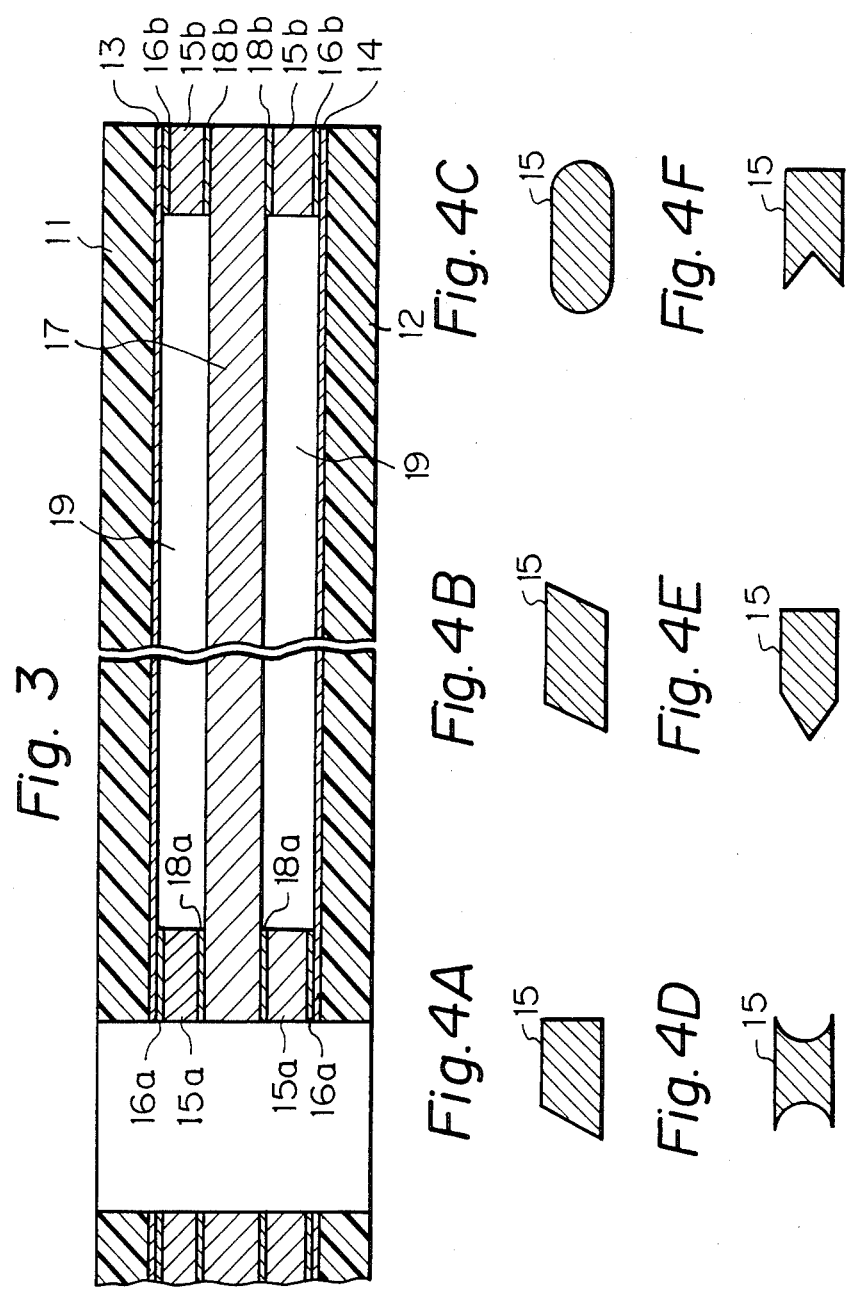

OPTICAL INFORMATION RECORDING DISK

BACKGROUND OF THE INVENTION

1. Field of the Invention

The present invention relates to optical media for recording information, and more specifically to an optical information recording disk having a pair of plates which form a space therebetween in which at least one of the plates carries an information bearing layer on the inner surfaces thereof.

2. Description of Background Information

Optical disks are popularly used for recording various information in which the information is recorded in the form of a large number of minute pits on the information bearing layer. The DRAW (Direct Read After Write) disk is an example of optical information recording disk in which the reading of the recorded information directly after writing is enabled.

Since the information is carried by the DRAW disk in the form of sequential arrangement of the pits, it is quite important to protect the information bearing layer in which the information is held as the series of pits.

To meet this condition, a conventional type of optical disk has been developed which used a pair of disk-shaped substrates at least one of which is transparent and carries the information bearing layer. Both of the substrates are placed to face each other and combined together by sandwiching an adhesive agent therebetween. Thus, the information bearing layer carried by the substrate is formed between the inward surfaces of the substrates.

On the other hand, for improving the recording characteristics of the DRAW disk, it has been required to raise the sensitivity of the information bearing layer so that the error ratio of the DRAW disk is reduced.

In the case of the above described dual substrate optical disks of conventional design, a drawback is that the information bearing layer is likely to become corroded by the adhesive agent used to combine two substrates when the information bearing layer is made extremely sensitive.

Furthermore, another conventional type of optical disk is also been developed in recent years. This type of DRAW disk comprises a pair of disk-shaped substrates each of which has a center bore and at least one of which substrate is transparent and carries the information bearing layer on the main surface thereof; an inner annular spacer aligned with the center bore and placed between the inner circumferential portion of the main surface of the substrates; an outer annular spacer positioned coaxially to the inner annular spacer and placed between the outer circumferential portion of the main surface of the substrates, these inner and outer annular spacers being respectively provided with circular grooves on cylindrical surfaces thereof so that the circular grooves face each other and having U-shaped cross-sections in the radial direction thereof; and a circular partition which is supported by means of the outer and inner annular spacers each having the circular groove so as to insert the outer and inner circumferential portions of the partition into the oppsite grooves of the spacers respectively. In this case, both of the substrates are placed to face each other and combined together through the inner and outer annular spacers so as to make a space therebetween. Thus, the outer circumferential portion of the circular partition is slidably fitted in the inward circular groove of the outer annular spacer, and the inner circumferential portion of the circular partition is also slidably fitted in the outward circular groove of the inner annular spacer, so that the circular partition separates the space existing between the substrates into two spaces. The information bearing layer formed on one of the substrate is opposite to an inward surface of the other substrate through the circular partition and the spaces.

In the case of this optical DRAW disk having gaps or spaces between the substrates, the corrosion of the information bearing layer caused by the adhesive agent, as the above described problem in the prior art, is almost avoided since the adhesive agent hardly touchs the information bearing layer except for the circumferential portions of the inward surfaces of the substrates.

However, this optical DRAW disk having such annular spacers is weak, because the substrates are slidably supported by only means of the inner and outer annular spacers having specific forms at the inner and outer circumferential portions thereof. Particularly, the outer annular spacer sandwiched between the substrates is easily fragile, because a shearing stress caused by the modification of the entire DRAW disk is concentrated on the bottom of the inward circular groove of the outer spacer having the U-shaped cross-section when such DRAW disk is loaded for playing in the player.

Thus, it is a problem concerning the strength of the DRAW disk in this conventional technique that the substrate must be manufactured with thickness enough to maintain the stiffness of the entire DRAW disk including its annular spacers, so that the apparatus for playing such DRAW disk should be made relatively large in size. For example, there appears a DRAW disk having a thickness of 8 mm in the market.

SUMMARY OF THE INVENTION

An object of the present invention is therefore to provide a miniature information recording disk such as a very thin DRAW disk maintaining the high sensitivity of the information bearing layer and the stiffness thereof.

According to the present invention, the recording disk is made up of a pair of disk-shaped substrates each having a center bore, a reinforcement disk provided with annular bank portions on the both main surfaces thereof at the inner and outer circumferential portions of the main surfaces thereof, in which the reinforcement disk is sandwiched between the substrates so as to maintain two spaces between the inward main surfaces of the substrates, and in which the cylindrical surface of the reinforcement disk is exposed to the outside.

BRIEF DESCRIPTION OF THE DRAWINGS

FIG. 3 is a partially enlarged sectional view of an embodiment of the optical information recording disk according to the present invention in its radial direction;

FIGS. 4A through 4F show sectional views of the annular spacers used in the embodiments of the optical information recording disk according to the present invention, showing enlarged views thereof in its radial direction;

DETAILED DESCRIPTION OF PREFERRED EMBODIMENTS

Before entering into the explanation of the embodiments of the present invention, conventional information recording disks will be outlined as references.

Figure 1:
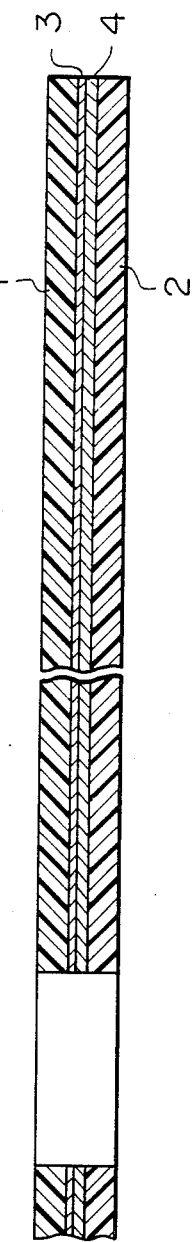
FIG. 1 is a partially enlarged sectional view of the outer circuferential portion of a conventional information recording disk in its radial direction.

Reference is first made to FIG. 1 which shows a partially enlarged sectional view for illustrating the structure of the recording disk such as the DRAW disk described in the above. As shown, this DRAW disk comprises a pair of transparent substrates 1 and 2 which are formed of synthetic resins for example, an information bearing layer 3 formed on the substrate 1, and an adhesive layer 4 combining the substrates 1 and 2 so that the substrates sandwich the information bearing layer 4 therebetween.

Figure 2:
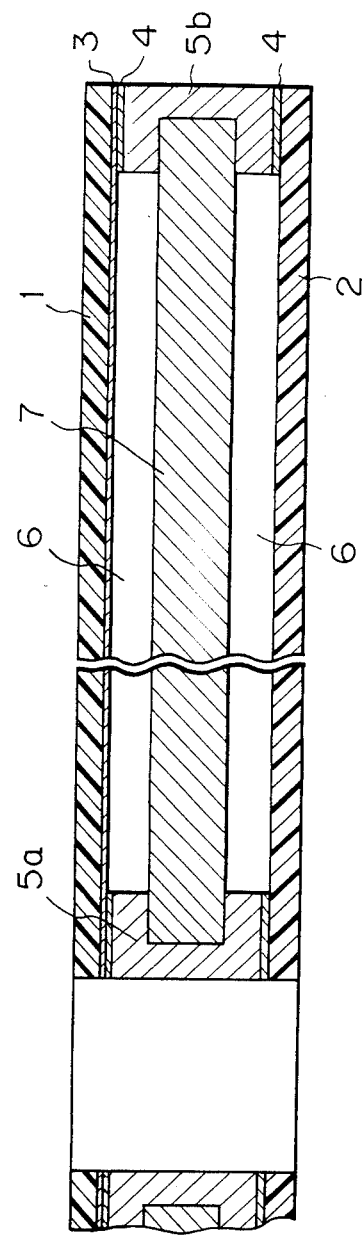
FIG. 2 is a partially enlarged sectional view of the outer circuferential portion of another conventional information recording disk in its radial direction.

Reference is now made to FIG. 2 which shows a partially enlarged sectional view for illustrating the structure of another DRAW disk hereinbefore described. As shown, this DRAW disk comprises a pair of transparent substrates 1 and 2 which have respectively center bores aligned with each other and adhered to the annular surfaces of the inner and outer annular spacers 5a and 5b via adhesive layers 4 and 4 so as to face each other while maintaining a gap therebetween. An information bearing layer 3 is formed on the inward main surface of the substrate 1. An inner annular spacer 5a is aligned with the center bores of the substrates 1 and 2 and is placed between the inner circumferential portions of the main surfaces of the substrates 1 and 2. An outer annular spacer 5b is coaxially placed with the inner annular spacer 5a between the outer circumferential portions of the main surfaces of the substrates 1 and 2. The outer and inner annular spacers are respectively provided with the circumferentially extending grooves at the side surfaces thereof confronting each other. The spacer has a U-shaped cross-section taken on a surface containing the central axis thereof. The adhesive layers 4 and 4 are respectively formed at the inner and outer circumferential portions of the main surfaces of the substrates 1 and 2. A circular partition 7 is slidably supported by these inner and outer spacers so that its outer circumference is fitted in the inward circular groove of the outer annular spacer without using of any adhesive agent and that its inner circumference is also fitted in the outward circular groove of the inner annular spacer without using of any adhesive agent. In this case, the circular partition 7 separates a space 6 existing between the substrates into two spaces. The features and disadvantages of these conventional DRAW disks have been already discussed.

Optical recording media according to the present invention will be hereinafter described with reference to FIG. 3 through FIG. 6.

As shown in FIG. 3, an information recording disk as a double sided disk according to the present invention is made up of a pair of transparent disk-shaped substrates 11 and 12 each having a center bore which carry information bearing layers 13 and 14 respectively thereon. A reinforcement disk 17 having a center bore is provided with outer annular spacers 15b and 15b adhered via adhesive layers 18b and 18b onto the outer circumferential portions of the both main surfaces thereof respectively and is likewise provided with inner spacers 15a and 15a adhered via adhesive layers 18a and 18a onto the inner circumferential portion thereof. Those outer and inner annular spacers form circular bank portions of those outer and inner circumferences of the reinforcement disk 17, while the reinforcement disk 17 is sandwiched between the substrates 11 and 12 through adhesive layers 16a, 16a, 16b and 16b which are formed at the inner and outer circumferential portions of the substrates so that two spaces 19 and 19 divided by the reinforcement disk are made between inner main surfaces of the substrates 11 and 12.

In this embodiment as illustrated hereinabove, each of the annular spacers has a radial cross-section of a rectangle. The annular spacers used in other modifications may be provided in its radial cross-section with the various shapes such as shown in FIGS. 4A through 4F, in which FIG. 4A shows a trapezoid cross-section; FIG. 4B shows a parallelogram cross-section; FIG. 4C shows a running track-shaped cross-section; FIG. 4D shows a cross-section of a rectangle dented its oposite sides by oposite semicircles; FIG. 4E shows a cross-section of a rectangle projected its side by a triangle; and FIG. 4F shows a cross-section of a rectangle dented its side by a triangle.

Figure 5:
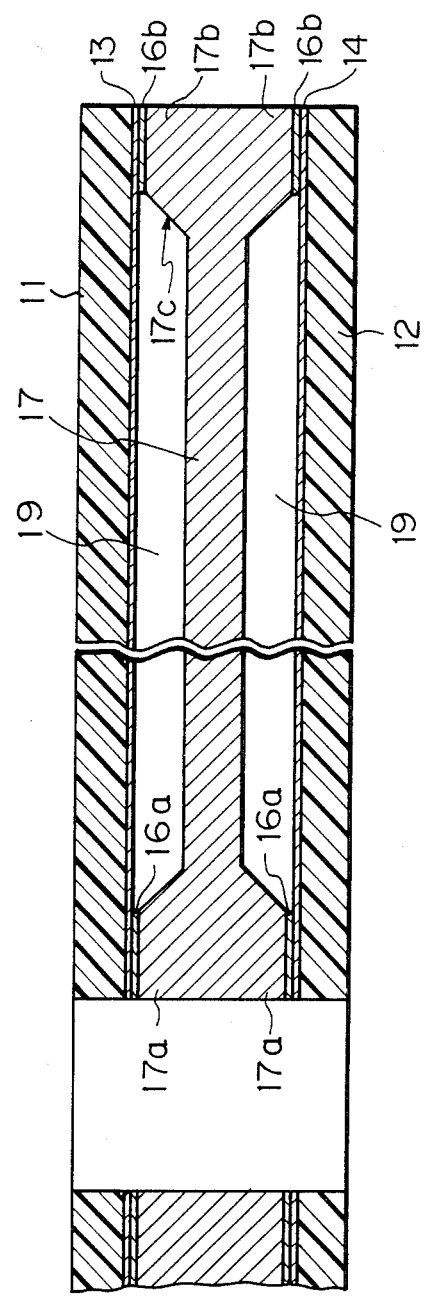
FIG. 5 is a partially enlarged sectional view of another embodiment of the optical information recording disk according to the present invention in its radial direction.
Figure 6:
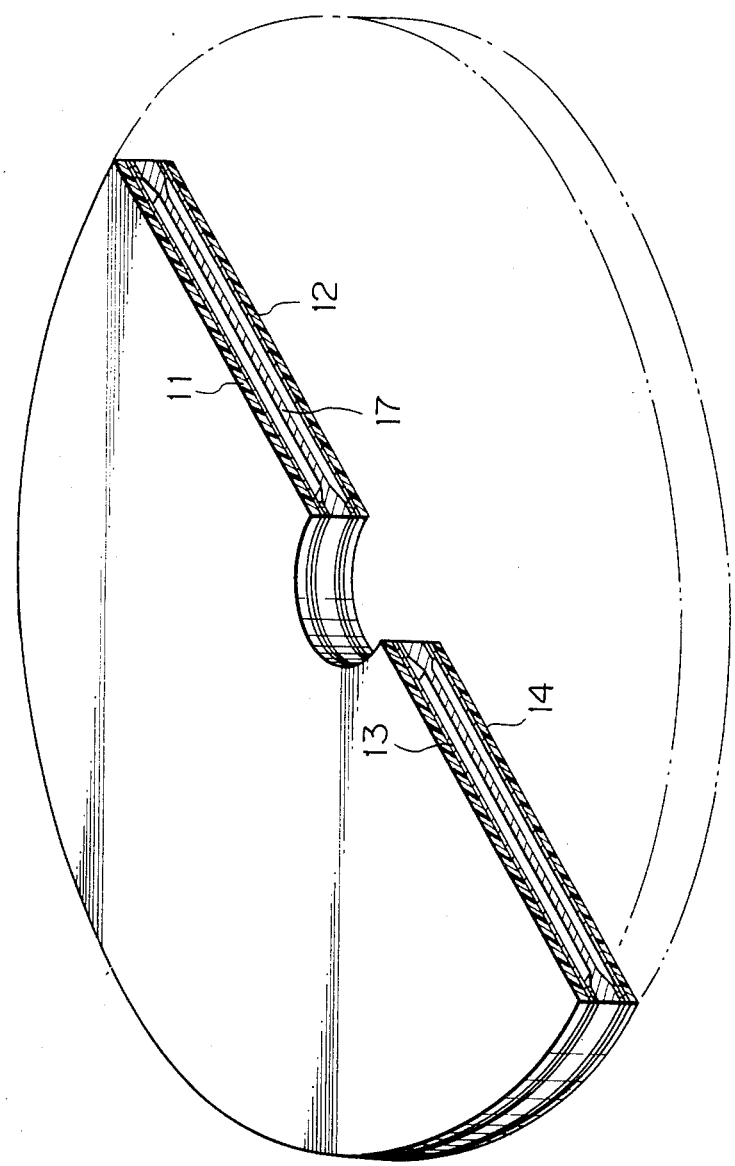
FIG. 6 is a perspective view of the information recording disk according to the present invention, showing the same disk of FIG. 6.

As shown in FIGS. 5 and 6, the second recording disk as a double sided disk according to the present invention is made up of a pair of transparent disk-shaped substrates 11 and 12 which carry information bearing layers 13 and 14 respectively thereon, and a reinforcement disk 17 integrally provided with annular bank portions 17a, 17a, 17b and 17b as two pair of inner and outer annular spacers at the outer and inner circumferences in both sides. Each of the annular bank portions has a radial cross-section of a trapezoid. The cicular bank portion is united with the reinforcement disk 17 at the bottom thereof by means of the injection moulding method with using of the same material such a synthetic resin. The inner bank surface 17c of the annular bank portion is so inclined as to form an obtuse angle together with the main surface of said renforcement disk (see FIGS. 5 and 6). Then, the reinforcement disk 17 is sandwiched between the substrates 13 and 14 through adhesive layers 16a, 16a, 16b and 16b. Each of the adhesive layers are formed between the surface of the circumferential portion of the substrate and the top surface of the annular bank portion, so that the substrates 13 and 14 are firmly fixed to the reinforcement disk 17 and that two spaces 19 and 19 are made between inner surfaces of the substrates 13 and 14 respectively.

In these embodiments, the disk-shaped substrates 11 and 12 are made of the transparent substances such as glass, polycarbonate resins, epoxy resins and acrylic resins preferably. These materials can be used if smoothness thereof is sufficient.

Futher, the guide tracks (not shown) may be formed on the substrate by using the stamper with a guide track and the injection moulding process or the spin coat process of such a synthetic resin. The guide tracks take the form of a shallow groove formed coaxially or spirally around the center bore of the substrate. With the method of the injection moulding process, the substrate is produced directly, and the guide track is transferred from the stamper to the substrate at the same time of the formation of the substrate.

Then, upon the main surfaces of the prepared substrates, the information bearing layer 13 and 14 are respectively formed by using the optical recording material e.g. the substance being sublimated by a laser spot. In the case of the examples shown in FIGS. 3 and 5, each substrate is coated with the solution of such substance by using the spin coat process. After that, the substrates are baked or dried for a pertinent period. Thus, the substrate having the information bearing layer is preferably obtained.

In the first embodiment, the reinforcement disk 17, the substrates 13 and 14 and two pairs of annular spacers 15a, 15a, 15b and 15b are assembled into a complete DRAW disk. The outer annular spacer 15b has a predetermined outer diameter equal to the outer diameters of both the substrate and the reinforcement disk so that the outer cylindrical surface of the renforcement disk is exposed to the outside. Further, the inner annular spacer 15a has a predetermined inner diameter equal to the inner diameter of the center bores of both the substrates and the reinforcement disk so that these center bores are aligned with the annular spacers and the inner cylindrical surface of the renforcement disk is exposed to the outside.

In the second embodiment, on the other hand, the reinforcement disk 17 is integrated with annular spacers as circular bank portions 17a and 17b at inner and outer circumferences in both sides. Therefore, it becomes facile to manufucture the reinforcement disk with the circular bank portions. When the injection moulding process is utilized in the producing of the reinforcement disk, the formation of the annular bank portion having the radially cross-section of a trapezoid is suitable for removing of the moulded reinforcement disk from its mould, since the inner surface of each of the annular bank portion is so inclined as to form an obtuse angle together with the main surface of the renforcement disk. In this case, the stiffness of the DRAW disk having the thus moulded renforcement disk is higher than that of the DRAW disk assembled with annular spacers.

In either case, the reinforcement disk 17 and the substrates 11 and 12 are pasted together with the adhesive agent on the top surface i.e. the annular surface of the spacer 15 or the bank portion 17a so as to cover up the information bearing layers 13 and 14 with spacers tightly.

In order to record the information on this recording disk, a laser beam e.g. having the wave lenght of about 830 nm is irradiated on the thus prepared recording disk. By the irradiation of the recording laser beam as a spot, the desired portions of the information bearing layer are sublimated and as a result a plurality of pits which carry the recording information are fromed. The read out of the informaiton is preformed by irradiating a read out laser beam and detecting the differece between the intensity of the beam reflected from the pits and the intensity of the beam reflected from the portion without pits.

Thus, according to the present invention, it is easy to produce the information recording disk, beacuse the reinforcement disk is integrally formed by the injection moulding process and the adhesive layer is almost omitted.

The circular partition in the conventional information disk is also omitted without decreasing the intensity of the disk as well as increasing the corrosion by the ashesive agent on the information bearing layer.

This is because the simple structure of the recording disk according to the present invention has a pair of substrates, an information bearing layer formed on at least one of the substrates, and a reinforcement disk provided with annular spacers or circular bank portions on its inner and outer circumferences in both sides. The circular bank portions of the reinforcement disk are integrally formed as annular spacers. The reinforcement disk is only sandwiched tightly between the substrates on the plan surface of the spacer or the bank portion so as to maintain the information bearing layer in the DRAW disk.

The stiffness of the information recording disk as a DRAW disk is improved by the use of this reinforcement disk provided with the circular bank portions each of which has the radial cross-section of a trapezoid. Furthermore, the stability of the information bearing layer of the DRAW disk is maintained by the decrease of using amount of the adhesive agent. The features of the present invention will be maintained advantageously even if the DRAW disk is formed as a single sided disk.

What is claimed is:

1. An optical information recording disk comprising:
a reinforcement disk having a center bore and provided with annular spacers on the both main surfaces thereof at the inner and outer peripheral side portions of the main surfaces thereof, the annular spacers and the reinforcement disk being integrated with each other and made of the same material, and
a pair of disk-shaped substrates each having a center bore and respectively adhered onto said annular spacers so as to respectively face the main surfaces of said reinforcement disk in such a manner that the center bores of said reinforcement disk and said disk-shaped substrates are aligned to each other, at least one of said disk-shaped substrates carrying an information bearing layer on the inner surface thereof, in which said reinforcement disk having the outer cylindrical surface thereof exposed to the outside in the radial direction, which is characterized in that the inner surface of each of said annular spacers is so inclined as to form an obtuse angle together with the main surface of said reinforcement disk.

* * * * *